(12) United States Patent
Sathianathan

(10) Patent No.: US 8,565,302 B2
(45) Date of Patent: *Oct. 22, 2013

(54) VIDEO STREAMING APPARATUS WITH QUANTIZATION AND METHOD THEREOF

(75) Inventor: Brainerd Sathianathan, San Jose, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,419

(22) Filed: Aug. 29, 2012

(65) Prior Publication Data

US 2013/0039413 A1 Feb. 14, 2013

Related U.S. Application Data

(63) Continuation of application No. 12/235,107, filed on Sep. 22, 2008, now Pat. No. 8,279,925.

(51) Int. Cl.
*H04N 7/30* (2006.01)

(52) U.S. Cl.
USPC ................... 375/240.05; 375/E7.159

(58) Field of Classification Search
None
See application file for complete search history.

(56) References Cited

U.S. PATENT DOCUMENTS

| | | |
|---|---|---|
| 2005/0025053 A1 | 2/2005 | Izzat |
| 2006/0109900 A1 | 5/2006 | Shen |
| 2007/0153916 A1 | 7/2007 | Demircin |
| 2008/0219356 A1 | 9/2008 | Johar |

*Primary Examiner* — Gilberto Barron, Jr.
*Assistant Examiner* — Izunna Okeke
(74) *Attorney, Agent, or Firm* — Farjami & Farjami LLP

(57) ABSTRACT

A streaming appliance having an internal quantizer is disclosed so that the bit rate of a streamed video can be adjusted based on the current conditions of a link between the streaming appliance and one or more target devices.

20 Claims, 4 Drawing Sheets ns and method relates generally to video
VIDEO STREAMING APPARATUS WITH QUANTIZATION AND METHOD THEREOF This application is a Continuation of U.S. patent application Ser. No. 12/235,107, filed on Sep. 22, 2008 now U.S. Pat. No. 8,279,925.

FIELD

The appliance and method relates generally to video streaming.

BACKGROUND

Systems and methods that code video are well known. The coding may involve transcoding that converts a compressed video from one format into another compressed format. The traditional approach is transcoding in the pixel domain referred to as the cascaded pixel domain approach. The cascaded pixel domain approach involves decoding the original video signal (decompressing it), performing the intermediate processing and then fully re-encoding the processed signal. The problem is that this type of transcoding is computationally expensive and very slow to perform which means that it is not possible to perform real-time transcoding.

The major areas of research in transcoding today focus on increasing the efficiency, i.e., decreasing the computational time. However, any gain in efficiency must have minimal impact on the quality of the transcoded video so that the viewer of the transcoded video does not perceive a degradation in video quality.

Currently, when a video is being streamed to a media player, the streaming is done using constant bit rate video streams. In the constant bit rate video streams, the bitrate, quantization, group of pixels and the regions of interest are constant. The problem is that a constant bit rate video requires a large amount of bandwidth to stream the video. It is desirable to provide a variable bit rate video streaming technique so that the bit rate of the stream can be adjusted depending on the available bandwidth of the link between the originator of the streaming video and recipient of the streaming video.

One current technique to provide variable bit rate streaming videos is to store multiple version of each piece of the same video wherein each version of each piece of the video has different characteristics such as bit rate, quantization, group of pixels or the regions of interest. Then, when a video is going to be streamed, a picker selects the appropriate pieces of the video with the appropriate characteristics to stream to the user. The problem with this approach is the massive amount of storage required to store all of the versions of each video. For example, a video that is 5 MB in size may require 200+MB of storage since all of the different versions of the different pieces of the video must be stored. This massive amount of storage makes the current technique unworkable for sites/companies that have a large number of videos to stream to users. Thus, it is desirable to provide an apparatus and method that overcomes the problems with the current techniques and it is to this end that the apparatus and method are directed.

DETAILED DESCRIPTION OF ONE OR MORE EMBODIMENTS

The apparatus and method are particularly applicable to the streaming of video signals over the web from a server to one or more mobile devices and it is in this context that the apparatus and method will be described. It will be appreciated, however, that the apparatus and method has greater utility as it may be used to stream video data from any origination source to any recipient and the video data may be streamed over any type of link with sufficient bandwidth to communicate the video data.

Figure 1:
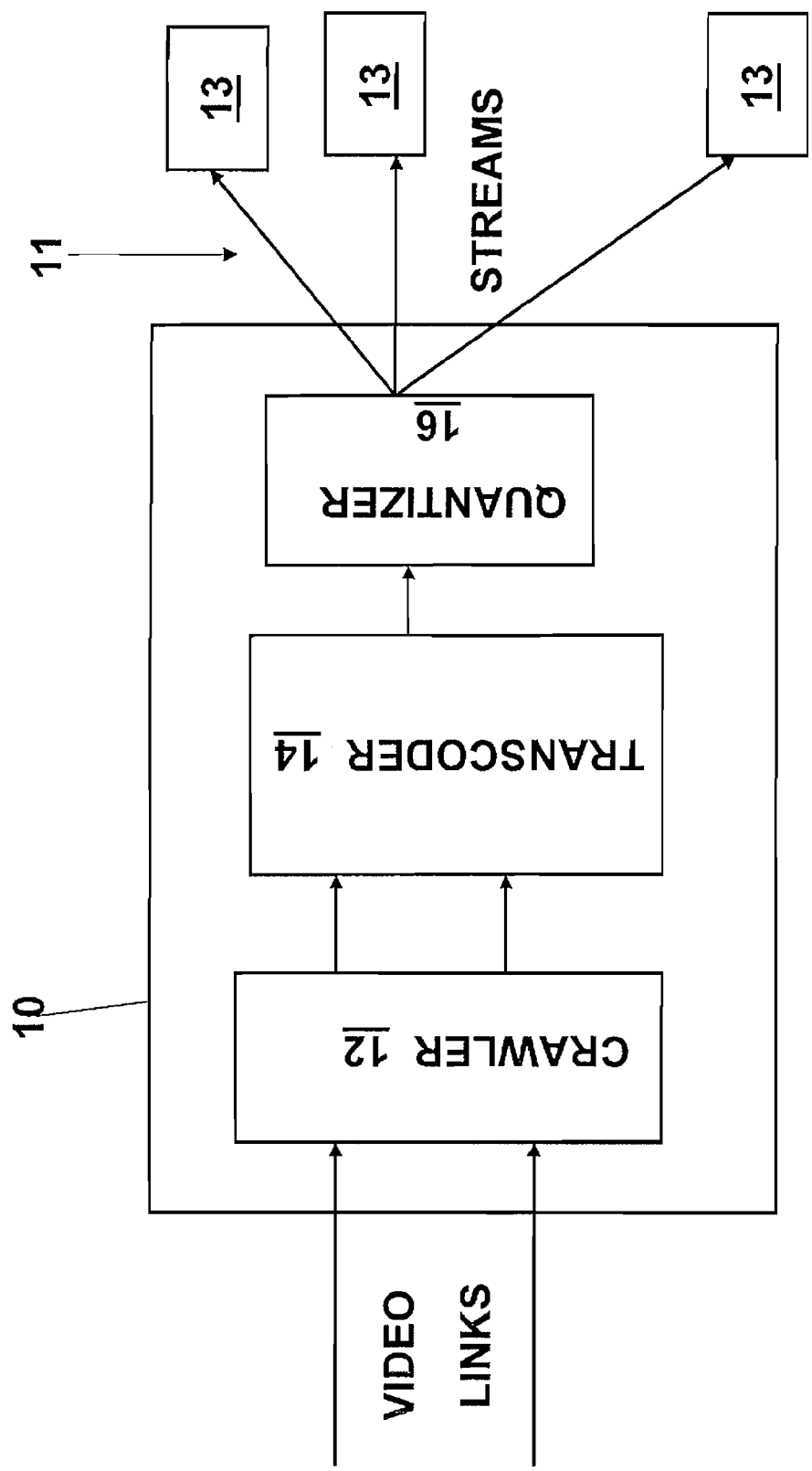
FIG. 1 illustrates an embodiment of a video streaming apparatus with quantization.

FIG. 1 illustrates an embodiment of a video streaming apparatus 10 with quantization that may be used to stream, in one implementation, video data from an originator, such as a server computer, over a link 11, such as the Internet, to one or more target devices 13 that each have a media player to play the streaming videos. Each target device may be a cellular phone, a mobile device with wireless telephone capabilities, a smart phone (such as the Blackberry products or the Apple iPhone) and the like which have a wireless capability and the capability to display/play a streaming video. The apparatus 10, in one implementation, is one or more server computers executing a plurality of lines of computer code to implement the operations described below for the apparatus 10. The apparatus 10 may also be implemented in hardware which may include one or more programmable logic devices, a processing unit executing a program and the like. In one implementation, the appliance 10 may be two Intel E5420 Quad Core processors, 4 2 Gb DDR2 DIMMs, two 1 TB RAID drives with 32 MB cache, an Ubuntu 6.1 operating system and Dual Gigabyte Ethernet NICs.

The apparatus 10 transcodes and stream video files over a mobile link whose bandwidth and quality changes often using adjustable video quantization to provide a variable bit rate streaming apparatus and method without the enormous storage requirements of the typical systems. As shown in FIG. 1, the apparatus 10 may receive video links (for example, uniform resource locators) that are links to web-sites with source video data that is going to be transcoded and streamed using the apparatus. The source video data may be in different formats such as in an MPEG format, an flash video format (.flv), a 3 gp format, an mp4 format, an h.263 format or an h.264 format, etc. which need to be transcoded so that it can be streamed by the apparatus. In the apparatus 10, a crawler 12 may resolve the video links and then download the source video data to the apparatus 10. The source video data is then passed onto a transcoder 14 that performs transcoding of the source video data to generate a transcoded video wherein all of the transcoded videos have the same form. During the transcoding, the source video data in the different formats may also require form conversion, resolution conversion, bit rate adjustment and/or frame rate adjustment.

Once the video had been transcoded into a transcoded video, it is passed onto a quantizer 16 that performs quantization on the transcoded video to generate a quanitized video (having a particular bit rate and quantization appropriate for the link over which the video will be streamed) which can then be streamed over the mobile link to one or more mobile devices.

Figure 2:
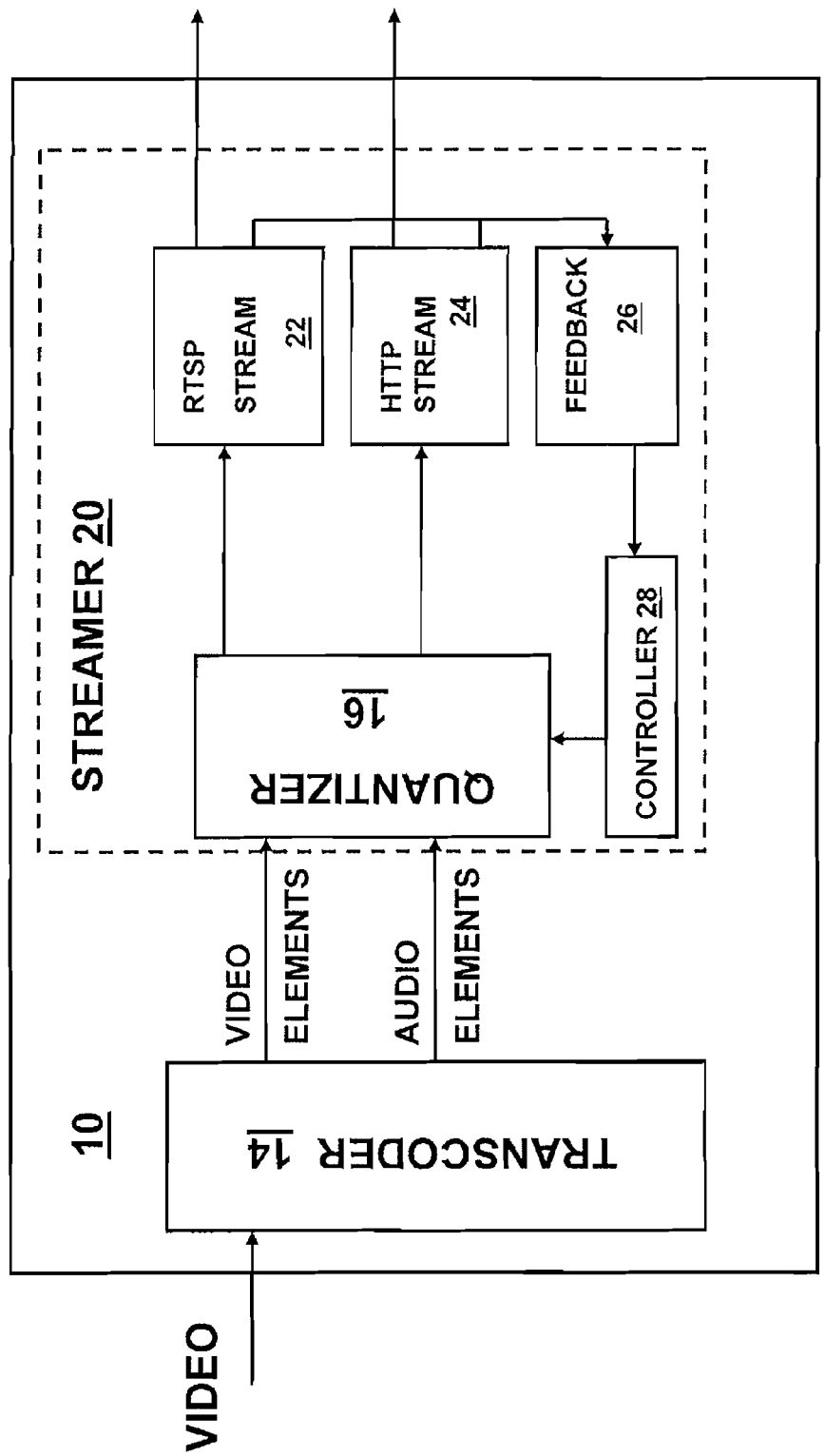
FIG. 2 illustrates more details of the embodiment of the video streaming apparatus with quantization.
Figure 3:
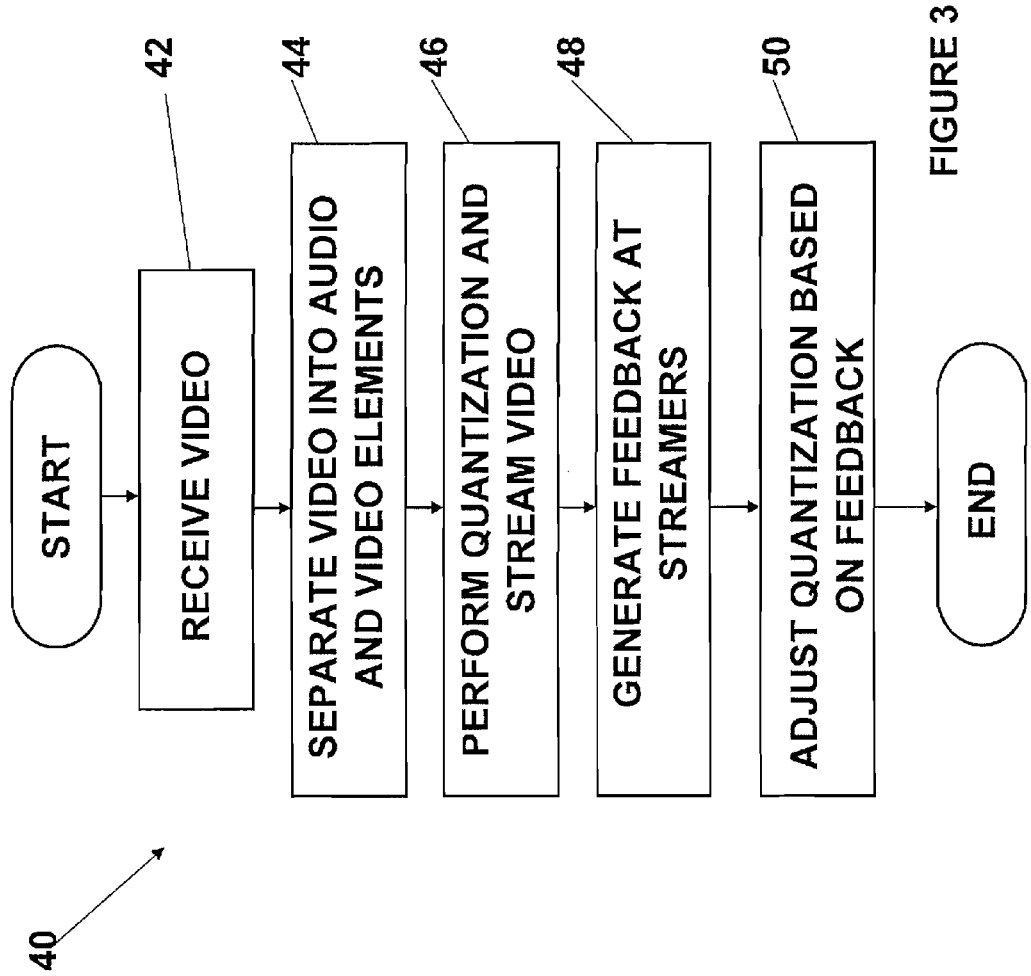
FIG. 3 illustrates a method for video streaming with quantization.

FIG. 2 illustrates more details of the embodiment of the video streaming apparatus 10 with quantization and FIG. 3 illustrates a method 40 for video streaming with quantization. The units and elements shown in FIG. 2 may be implemented, in one embodiment, as a plurality of lines of computer code which are executed by an appliance with one or more processing units and memory wherein the plurality of lines of computer code are stored in the memory and executed by the one or more processing units. Alternatively, the units and elements shown in FIG. 2 may be implemented using ASICs or in software. As shown in FIG. 2, a piece of source video data is received by the transcoder 14 (process 42 as shown in FIG. 3). The source video data may include a flash video (.flv) or a live video on demand wherein the source video includes one or more elementary video pieces of data (in an h.263 format, for example) and one or more elementary audio pieces of data (in an mp3 format for example) which are wrapped in container structure (such as the flv format). Thus, as part of the transcoding process, the elementary video and audio elements are extracted from the container (process 44 as shown in FIG. 3). There are three primary outputs that are expected from the streamer, these outputs are based on the currently supported mobile phone standards. They are shown below as pairs of video and audio.

1. H263/AMR
2. H264/AAC
3. MPEG4/AAC

Based on this output expectation the streamer will expect either on of the above elementary stream formats from the transcoder. However this architecture is not limited to the above formats and can easily be extended to support future formats as well with minimal changes to the transcoder and quantizer.

The elementary video and audio elements then may be fed into a streamer unit 20 that includes the quantizer 16 that performs quantization of the elementary video and audio data (process 46 in FIG. 3). The quantizer may use a typical, known codec quantization function. The level of quantization for each piece of elementary video and audio data depends on a feedback unit 26 that receives feedback data from the stream units 22, 24 (process 48 in FIG. 3) and then feeds the feedback data to a controller 28 that adjusts the quantization of the quantizer based on the feedback data (process 50 in FIG. 3) as described below in more detail. Once the elementary video and audio have been quantized, the quantized video and audio data are combined and output for streaming. As shown in FIG. 2, the streamer unit 20 also may include an real time streaming protocol (RTSP) streaming unit 22 and an HTTP streaming unit 24 that, respectively, stream RTSP data and HTTP data. The two streaming units shown in FIG. 2 allow the streamer 20 (and therefore the appliance 10) to stream data in the two well known streaming output protocols.

Figure 4:
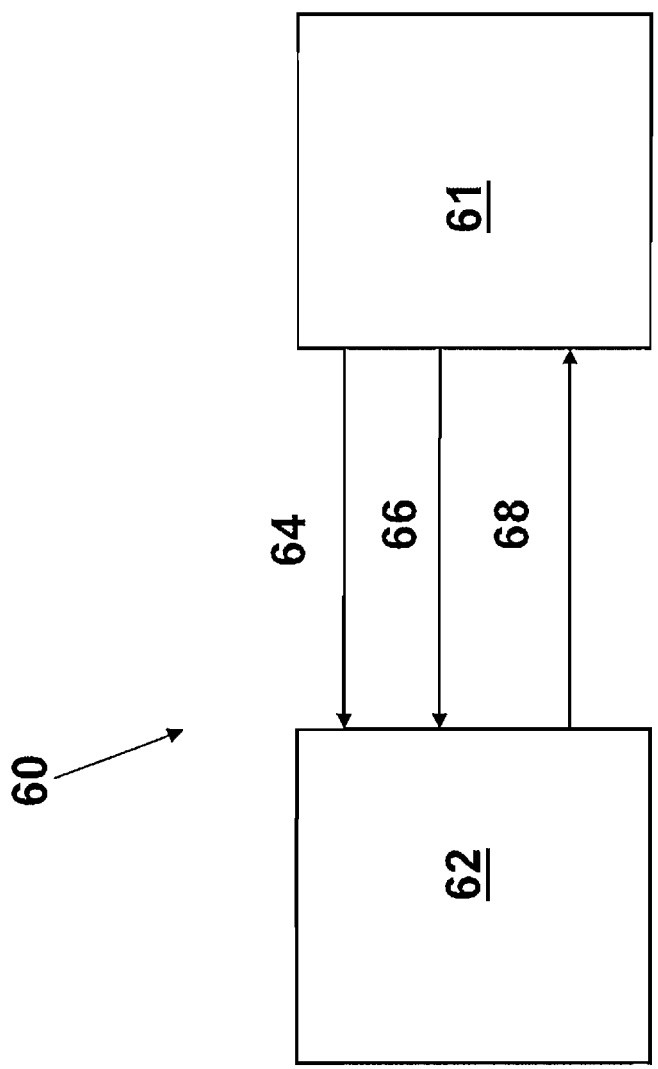
FIG. 4 illustrates an example of a method for calculating quantization adjustments.

FIG. 4 illustrates an example of a method 60 for calculating quantization adjustments when using RTSP protocols. In particular, the RTSP protocol standard defines a sender report (SR) and a receiver report (RR) that are exchanged between the streaming unit 61, such as a streaming server, and a target device 62, such as a mobile phone over a link. As shown, video and audio elements of the streaming data 64 are sent from the streaming unit 61 to the target device 62 along with a well known sender report. In response, the target device, according to the RTSP protocol, returns a receiver report. The HTTP streaming will take place on top up TCP. Due to the connection mode of TCP, we can simple count the outgoing packets and the error rate of the network from the sockets. This data will be used to calculate the average throughput (AVTH). The receiver report identifies and provides data about current link conditions. For example, the RR may include data about round trip time (RT) of the sender report being sent out until the receiver report is received, jitter, fractional packet loss and complete packet loss all of which can be used to assess the condition of the link between the streaming unit 61 and the target device. As shown in FIG. 2, feedback unit 26 gathers this information from each streamer unit 22, 24 and the controller performs an analysis of the feedback data to adjust the quantization of the quantizer 16 based on the condition of the link between the appliance 10 and each target device 13 as shown in FIG. 1.

In one implementation, the controller 28 may be implemented in software executing on a processing unit and may operate as set forth in the pseudocode below:

```
double getAVTH(double RTT, double PL , double FPL , double Jitter)
    double rtt__multi= 0.0;
    double pl__multi = 0.0;
    double jitter__multi = 0.0;
    double fpl__multi = 0.0;
    rtt__multi = (RTT==O) ? 0: RTT;
    pl__multi = (PL<=1) ? PL: (PL/10000);
    jitter__multi = (Jitter<1)? Jitter: (Jitter/100000);
    fpl__multi = (FPL <=1) ? FPL: (FPL/1000);
    return (rtt__multi + pl__multi + jitter__multi +fpl__multi);
}
``` wherein the inputs are: Round trip delay (RTT), Packet Loss (PL), Fractional Packet Loss (FPL) and jitter (Jitter) which are derived from the RR. The method calculates a value called link throughput called AVTH. The receiver report (RR) is obtained every two second from the target device(s) and the AVTH is calculated every second. Depending on the configuration, an average of two or three consecutive values of AVTH is determined and the average lambda is calculated. There are 16 states of calibrated values for lambda:

double shape [16][16] =

$$\left\{\begin{array}{l}
\{2.18, -1, -1, -1, -1, -1, -1, -1, \\ -1, -1, -1, -1, -1, -1, -1, -1\}, \\
\{2.18, 2.19, -1, -1, -1, -1, -1, -1, \\ -1, -1, -1, -1, -1, -1, -1, -1\}, \\
\{2.18, 5.17, 5.18, -1, -1, -1, -1, -1, \\ -1, -1, -1, -1, -1, -1, -1, -1\}, \\
\{2.18, 5.17, 10.3, 10.31, -1, -1, -1, \\ -1, -1, -1, -1, -1, -1, -1, -1, -1\}, \\
\{2.18, 3.74, 8.96, 20.32, 20.33, -1, -1, \\ -1, -1, -1, -1, -1, -1, -1, -1, -1\}, \\
\{2.18, 3.74, 8.96, 18.36, 33.36, 33.37, \\ -1, -1, -1, -1, -1, -1, -1, -1, -1, -1\}, \\
\{2.18, 3.74, 6.2, 13.26, 25.16, 45.69, 45.70 \\ -1, -1, -1, -1, -1, -1, -1, -1, -1, \}, \\
\{2.18, 3.74, 6.2, 13.26, 25.16, 40.28, 58.76, \\ 58.77, -1, -1, -1, -1, -1, -1, -1, -1\}, \\
\{2.18, 3.74, 6.2, 13.26, 20.32, 40.28, 79.55, \\ 142.94, 142.95, -1, -1, -1, -1, -1, -1, -1\}, \\
\{2.18, 3.18, 5.17, 11.22, 18.36, 33.35, 58.76, \\ 142.9, 197.05, 197.06, -1, -1, -1, -1, -1, -1\}, \\
\{1.76, 2.18, 3.18, 5.17, 11.22, 18.36, 33.35, \\ 47.71, 56.76, 142.9, 143, -1, -1, -1, -1, -1\}, \\
\{1.76, 2.18, 3.18, 5.17, 11.22, 18.36, 33.35, 47.71, \\ 58.76, 142.9, 197.1, 197.12, -1, -1, -1, -1\}, \\
\{1.76, 2.18, 3.54, 6.2, 12.24, 18.36, 29.58, 40.28, \\ 47.71, 79.55, 142.9, 197.1, 197.12, -1, -1, -1\}, \\
\{1.76, 2.18, 3.54, 6.2, 12.24, 18.36, 29.58, 40.28, \\ 47.71, 79.55, 142.9, 197.1, 663.85, 663.86, -1, -1\}, \\
\{1.76, 2.18, 3.54, 6.2, 12.24, 18.36, 29.58, 40.28, 47.71, \\ 79.55, 142.9, 197.1, 663.85, 1945.06, 1945.06, -1\}, \\
\{1.76, 2.18, 3.18, 4.29, 5.17, 12.24, 25.16, 33.35, 45.69, \\ 58.76, 79.55, 90.28, 142.94, 663.85, 1945.06, 1945.07\}
\end{array}\right\};$$

In most cases we assume that there are 16 states and every state has two 2 value differences in quantization. The higher the state, the higher the quantization which means a lower bit rate. The lower the state, the lower the value in quantization and a higher bit rate.

In more detail, the method may:
1. Obtain the Receiver Report
2. Calculate AVTH
3. Calculate Average lambda
4. Select on a state, assume there is 16 states, compare where the average lambda value with the state. For example say lambda is 45.7 in that case that value is between the 9 th and the 10 index on the matrix.

The resulting bit rate is calculated by the following: resulting_bit_rate:

Quant(State_Index*2).

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A method of streaming a video to one or more wireless devices using a streaming device, the method comprising:
    transcoding the video having a first coding format to generate a transcoded video having a second coding format;
    quantizing the transcoded video having the second coding format using a first quantization level to generate a first quantized transcoded video;
    transmitting the first quantized transcoded video to a first wireless device of the one or more wireless devices;
    receiving feedback data relating to conditions of a first link connecting the first wireless device and the streaming device, in response to transmitting the first quantized transcoded video to the first wireless device;
    changing the first quantization level to a second quantization level in response to receiving the feedback data relating to the conditions of the first link;
    quantizing the transcoded video having the second coding format using the second quantization level to generate a second quantized transcoded video; and
    transmitting the second quantized transcoded video to the first wireless device.

2. The method of claim 1 further comprising:
    receiving a URL (uniform resource locator) for the video; and
    downloading the video to the device, prior to the transcoding.

3. The method of claim 1 further comprising:
    transcoding the video having the first coding format to generate a transcoded video having a third coding format;
    quantizing the transcoded video having the third coding format using a third quantization level to generate a third quantized transcoded video;
    transmitting the third quantized transcoded video to a second wireless device;
    receiving feedback data relating to conditions of a second link connecting the second wireless device and the streaming device, in response to transmitting the third quantized transcoded video to the second wireless device;
    changing the third quantization level to a fourth quantization level in response to receiving the feedback data relating to the conditions of the second link;
    quantizing the transcoded video having the third coding format using the fourth quantization level to generate a fourth quantized transcoded video; and
    transmitting the fourth quantized transcoded video to the second wireless device.

4. The method of claim 3, wherein the third quantization level is the same as the first quantization level and the fourth quantization level is the same as the second quantization level.

5. The method of claim 3, wherein the third coding format is the same as the second coding format.

6. The method of claim 1, wherein the second coding format is one of H263, H264 and MPEG4.

7. The method of claim 1, wherein the feedback data relating to the conditions of the first link include at least one of a round trip time, a fractional packet loss value, a packet loss value and a jitter value.

8. The method of claim 1, wherein the feedback data relating to the conditions of the first link are included in a receiver report from the first wireless device.

9. A method of streaming an audio to one or more wireless devices using a streaming device, the method comprising:

transcoding the audio having a first coding format to generate a transcoded audio having a second coding format;

quantizing the transcoded audio having the second coding format using a first quantization level to generate a first quantized transcoded audio;

transmitting the first quantized transcoded audio to a first wireless device of the one or more wireless devices;

receiving feedback data relating to conditions of a first link connecting the first wireless device and the streaming device, in response to transmitting the first quantized transcoded audio to the first wireless device;

changing the first quantization level to a second quantization level in response to receiving the feedback data relating to the conditions of the first link;

quantizing the transcoded audio having the second coding format using the second quantization level to generate a second quantized transcoded audio; and transmitting the second quantized transcoded audio to the first wireless device.

10. The method of claim 9 further comprising:

receiving a URL (uniform resource locator) for the audio; and downloading the audio to the device, prior to the transcoding.

11. The method of claim 9 further comprising:

transcoding the audio having the first coding format to generate a transcoded audio having a third coding format;

quantizing the transcoded audio having the third coding format using a third quantization level to generate a third quantized transcoded audio;

transmitting the third quantized transcoded audio to a second wireless device;

receiving feedback data relating to conditions of a second link connecting the second wireless device and the streaming device, in response to transmitting the third quantized transcoded audio to the second wireless device;

changing the third quantization level to a fourth quantization level in response to receiving the feedback data relating to the conditions of the second link;

quantizing the transcoded audio having the third coding format using the fourth quantization level to generate a fourth quantized transcoded audio; and transmitting the fourth quantized transcoded audio to the second wireless device.

12. The method of claim 11, wherein the third quantization level is the same as the first quantization level and the fourth quantization level is the same as the second quantization level.

13. The method of claim 11, wherein the third coding format is the same as the second coding format.

14. The method of claim 9, wherein the second coding format is one of AMR and AAC.

15. The method of claim 9, wherein the feedback data relating to the conditions of the first link include at least one of a round trip time, a fractional packet loss value, a packet loss value and a jitter value.

16. The method of claim 9, wherein the feedback data relating to the conditions of the first link are included in a receiver report from the first wireless device.

17. A streaming device for streaming an audio to one or more wireless devices, the streaming device comprising:

a transcoder configured to transcode the audio having a first coding format to generate a transcoded audio having a second coding format;

a quantizer configured to quantize the transcoded audio having the second coding format using a first quantization level to generate a first quantized transcoded audio;

a transmitter configured to transmit the first quantized transcoded audio to a first wireless device of the one or more wireless devices;

wherein the streaming device is configured to:

receive feedback data relating to conditions of a first link connecting the first wireless device and the streaming device, in response to transmitting the first quantized transcoded audio to the first wireless device; and change the first quantization level to a second quantization level in response to receiving the feedback data relating to the conditions of the first link;

the quantizer is further configured to quantize the transcoded audio having the second coding format using the second quantization level to generate a second quantized transcoded audio; and the transmitter is configured to transmit the second quantized transcoded audio to the first wireless device.

18. The streaming device of claim 17, wherein:

the transcoder is configured to transcode the audio having the first coding format to generate a transcoded audio having a third coding format;

the quantizer is further configured to quantize the transcoded audio having the third coding format using a third quantization level to generate a third quantized transcoded audio;

the transmitter is configured to transmit the third quantized transcoded audio to a second wireless device;

wherein the streaming device is further configured to:

receive feedback data relating to conditions of a second link connecting the second wireless device and the streaming device, in response to transmitting the third quantized transcoded audio to the second wireless device; change the third quantization level to a fourth quantization level in response to receiving the feedback data relating to the conditions of the second link;

the quantizer is further configured to quantize the transcoded audio having the third coding format using the fourth quantization level to generate a fourth quantized transcoded audio; and the transmitter is configured to transmit the fourth quantized transcoded audio to the second wireless device.

19. The streaming device of claim 18, wherein the third quantization level is the same as the first quantization level and the fourth quantization level is the same as the second quantization level.

20. The streaming device of claim 18, wherein the third coding format is the same as the second coding format.

* * * * *